(12) United States Patent
Gole et al.

(10) Patent No.: US 7,870,108 B2
(45) Date of Patent: Jan. 11, 2011

(54) METHOD AND APPARATUS FOR VERSION MANAGEMENT OF A DATA ENTITY

(75) Inventors: Rémy Gole, Grasse (FR); Brigitte Ruscica, Grasse (FR); Alexandre Chabod, Peymeinade (FR); Lénaïc Huard, Valbonne (FR); Rudy Daniello, Nice (FR)

(73) Assignee: Amadeus S.A.S., Sophia Antipolis Cedex (FR)

( * ) Notice: Subject to any disclaimer, the term of this patent is extended or adjusted under 35 U.S.C. 154(b) by 332 days.

(21) Appl. No.: 11/904,062

(22) Filed: Sep. 25, 2007

(65) Prior Publication Data

US 2009/0083056 A1   Mar. 26, 2009

(51) Int. Cl.
*G06F 17/30* (2006.01)
(52) U.S. Cl. ..................... 707/695; 707/638
(58) Field of Classification Search ............... 707/203, 707/638, 695, 806; 715/229; 717/170
See application file for complete search history.

(56) References Cited

U.S. PATENT DOCUMENTS

| | | | |
|---|---|---|---|
| 2002/0103814 A1 | 8/2002 | Duvillier et al. | |
| 2002/0120648 A1* | 8/2002 | Ball et al. | 707/511 |
| 2005/0262164 A1 | 11/2005 | Guiheneuf et al. | |
| 2005/0262165 A1* | 11/2005 | Scott et al. | 707/203 |
| 2006/0004755 A1 | 1/2006 | Basu et al. | |
| 2006/0064467 A1 | 3/2006 | Libby | |
| 2006/0072556 A1 | 4/2006 | Garrett | |
| 2006/0143243 A1 | 6/2006 | Polo-Malouvier et al. | |
| 2007/0175990 A1 | 8/2007 | Sarma et al. | |

FOREIGN PATENT DOCUMENTS

| | | |
|---|---|---|
| EP | 0 520 459 A2 | 12/1992 |
| WO | WO 02/48919 | 6/2002 |
| WO | WO 02/102741 | 12/2002 |
| WO | WO 03/096226 | 11/2003 |
| WO | WO 2006/010979 | 2/2006 |
| WO | WO 2006/063679 | 6/2006 |

* cited by examiner

*Primary Examiner*—Jean B. Fleurantin
*Assistant Examiner*—Thu-Nguyet Le
(74) *Attorney, Agent, or Firm*—Drinker Biddle & Reath LLP

(57) ABSTRACT

A system for identifying a parameter in a version of a data entity created at a specific time, wherein at a first time the version is an active version and at a second time the version is a previous version, the system comprising: a database for storing the plurality of versions of the data entity as they are created; a cache for storing the first active version of the data entity; wherein when a new version of the data entity is created by updating at least one parameter of the data entity, a new active version replaces the first active version stored in a cache and the first active version becomes a previous version stored in the cache; and wherein the new active version includes a list of the or each previous version of the data entity with an associated time at which the version was an active version, such that by identifying the version of the data entity which was active at the specific time the parameter is determined.

12 Claims, 5 Drawing Sheets

METHOD AND APPARATUS FOR VERSION MANAGEMENT OF A DATA ENTITY

FIELD OF THE INVENTION

The present invention relates a method and apparatus for the management of data entities and version control of the data, in particular to enable version selection for determination of historical data.

BACKGROUND OF THE INVENTION

In many database systems, data is stored and often updated at various points during the life of the data. This leads to a number of versions of a given set of data. Historically, a new or active version replaces a so-called previous version and it is not always possible to establish the content of the previous version once the new version has been stored. This is particularly the case in the travel environment, where customers purchase an airline ticket, for example and then wish to change the airline ticket at a later date.

It is well known that the tariff of an airline ticket will change between the date that the airline ticket becomes available and the date of travel. Accordingly, if the customer wishes to change the ticket at a certain point in time, the tariff may be different from the date on which the customer purchased the ticket. In this way the customer is either reimbursed at a level that is higher or lower than the purchase price but there is no guarantee that the customer is reimbursed at the level of the tariff on the date of purchase of the ticket.

US 2002/120648 (AT&T) discloses a method for accessing specific versions of documents and allowing the user to see the differences between the first and second version. An archive system makes copies of the different versions of the documents in order to keep them for any further requests from the user. The method also provides a system for comparing two different versions in order to point out the differences to the user. However, the only available version that is accessible to the user is the newest version; it is not possible to directly present the data content of a previous version to the user.

SUMMARY OF THE INVENTION

An object of the present invention is to alleviate at least some of the problems associated with the prior art systems.

A further object of the present invention is to provide a method and apparatus for the management of data entities and versions thereof that enables historical analysis of the data and identification of particular parameters.

According to one aspect of the present invention there is provided a system for identifying a parameter in a version of a data entity created at a specific time, wherein, at a first time the version is an active version and at a second time the version is a previous version, the system comprising: a database for storing the plurality of versions of the data entity as they are created; a cache for storing the first active version of the data entity; wherein when a new version of the data entity is created by updating at least one parameter of the data entity, a new active version replaces the first active version stored in a cache and the first active version becomes a previous version stored in the cache; and wherein the new active version includes a list of the or each previous version of the data entity with an associated time at which the version was an active version, such that by identifying the version of the data entity which was active at the specific time the parameter is determined.

According to a second aspect of the present invention there is provided a method of identifying a parameter in a version of a data entity created at a specific time, wherein, at a first time the version is an active version and at a second time the version is a previous version, the method comprising the steps of: creating a first version of a data entity; storing the first version of the data entity in a memory location, such that the first version is the active version at this time; updating at least one parameter associated with the data entity in order to create a second version of the data entity; storing the second version of the data entity in a memory location, such that the second version is now the active version and the first version is now a previous version, the second version including a list of the or each previous version of the data entity with an associated time at which the version was an active version; identifying the version of the data entity which was active at the specific time; determining the parameter at said specific time.

There are many advantages provided by the present invention. For example, it is always possible with the present invention to determine the exact parameters relating to a particular version by means of a simple mechanism using multiple data entities to facilitate links between different versions. By operating this type of mechanism the speed with which an operator can access the parameters of a particular version is optimized and response time is kept short which assists the operators in expediting their actions. The invention also enables operators to ensure that any reimbursement made is made at the correct level, thereby ensuring the operator does not lose money by effecting a change at an inaccurate cost level. Similarly, the customer is not out of pocket by being reimbursed at a lower level.

BRIEF DESCRIPTION OF THE DRAWINGS

Reference will now be made, by way of example, to the accompanying drawings, in which.

DETAILED DESCRIPTION OF THE EMBODIMENTS

In this description, the word date indicates a calendar date, the word time indicates a period of time or a time of the day or a moment in time and the word timestamp indicates the date and time at which a version is created.

Figure 1:
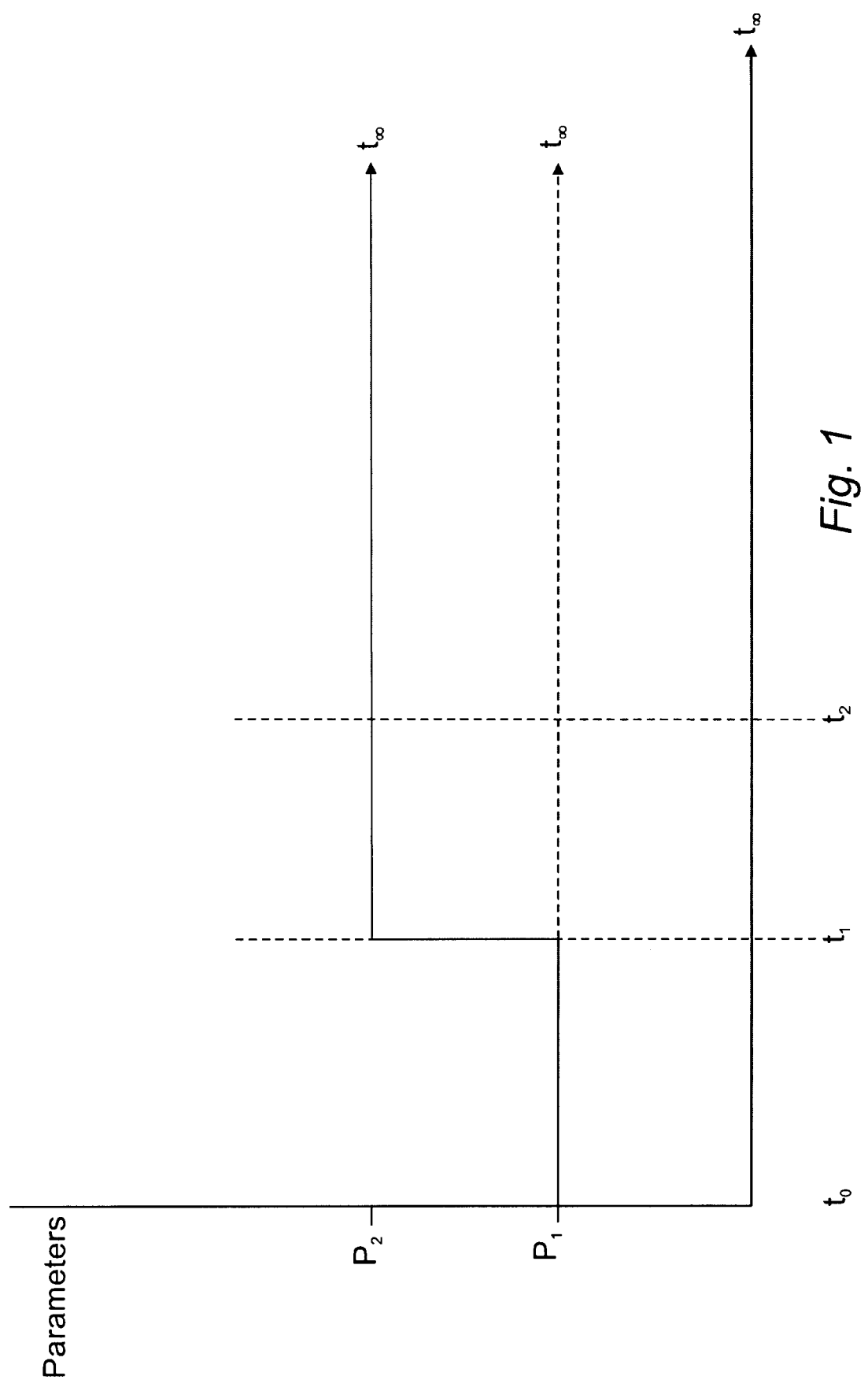
FIG. 1 is a simplified diagram for describing a prior art version mechanism.

FIG. 1 shows a prior art version mechanism. At time $t_0$ a version $V_1$ is created having a parameter $P_1$. Normally, version $V_1$ would be expected to last until time $t_\infty$. At time $t_1$ a new version $V_2$ is created, where at least parameter $P_1$ is changed to $P_2$. Version $V_2$ replaces version $V_1$ and would normally be expected to last until time $t_\infty$. As version $V_2$ replaces version $V_1$ the contents of version $V_1$ are no longer available. Accordingly, if a customer or operator wishes to determine the parameter $P_1$ in version $V_1$ at time $t_2$, this would not be possible.

Figure 2:
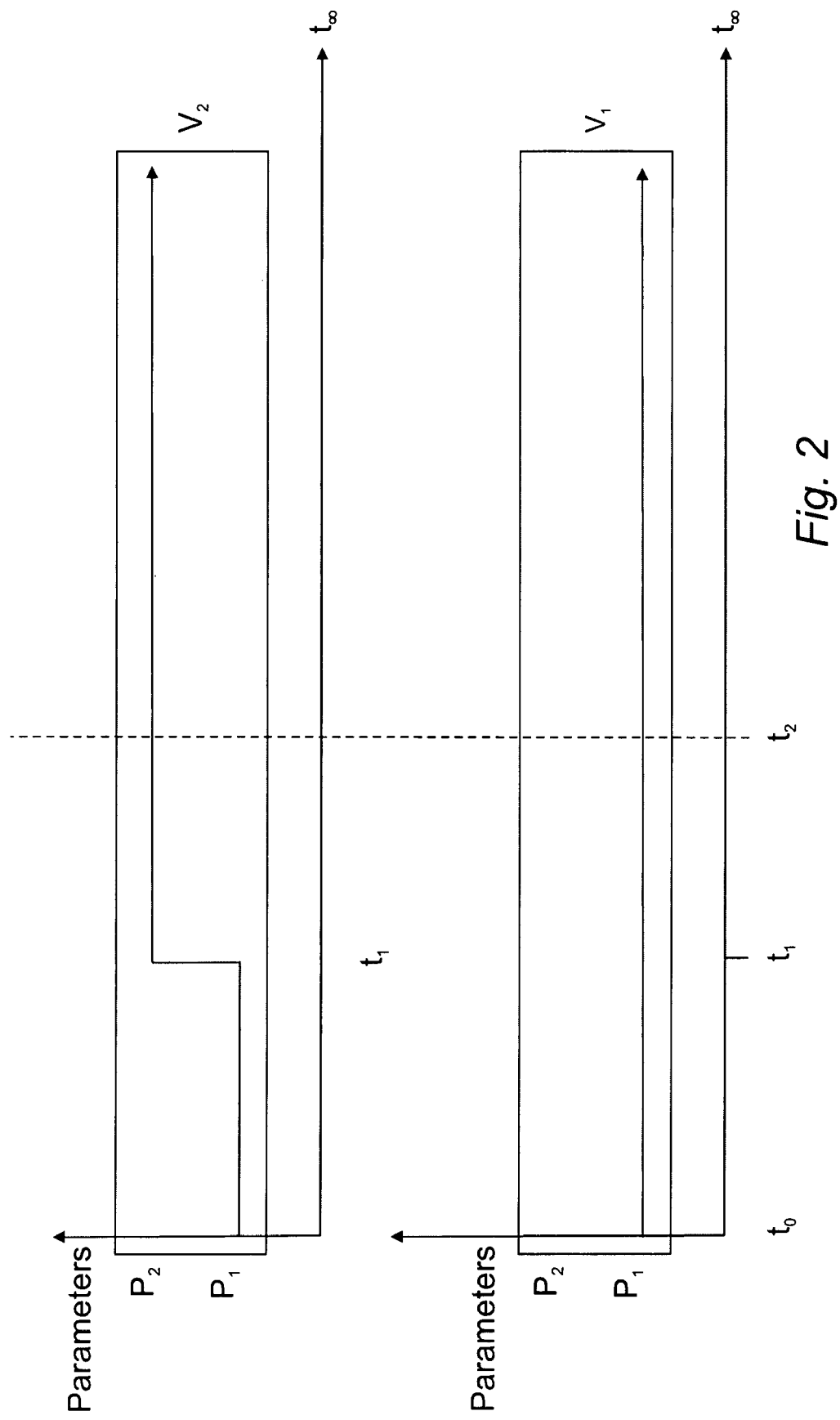
FIG. 2 is a diagram showing version control in accordance with one embodiment of the present invention, by way of example.

Referring to FIG. 2, a version control mechanism according to an embodiment of the present invention will now be described. At time $t_0$ a version $V_1$ is created having a parameter $P_1$. Normally, version $V_1$ would be expected to last until time $t_\infty$. At time $t_1$ a new version $V_2$ is created, where at least parameter $P_1$ is changed to $P_2$. Version $V_1$ is stored, in for example a cache, and linked to version $V_2$, in a manner that will be described in greater detail below. Version $V_2$ becomes the active version and parameter $P_2$ becomes the active parameter. At time $t_2$, a customer may wish to determine the parameter ($P_1$ or $P_2$) which existed at a certain point in time, as $V_2$ is active and has a link to $V_1$ the correct parameter can be readily identified. The details of this will be described in greater detail below. Further versions may be added and the newest version will become the active version, with all previous versions being linked to the newest version. Each version will include a timestamp based on GMT or any other appropriate time base. The linkage may be made through the date and time of creation of each version to enable a customer or operator to determine which version was active at a given date and time. The linkage may be provided through any other appropriate means, for example, price, supplier or any other link appropriate to the application.

Figure 3:
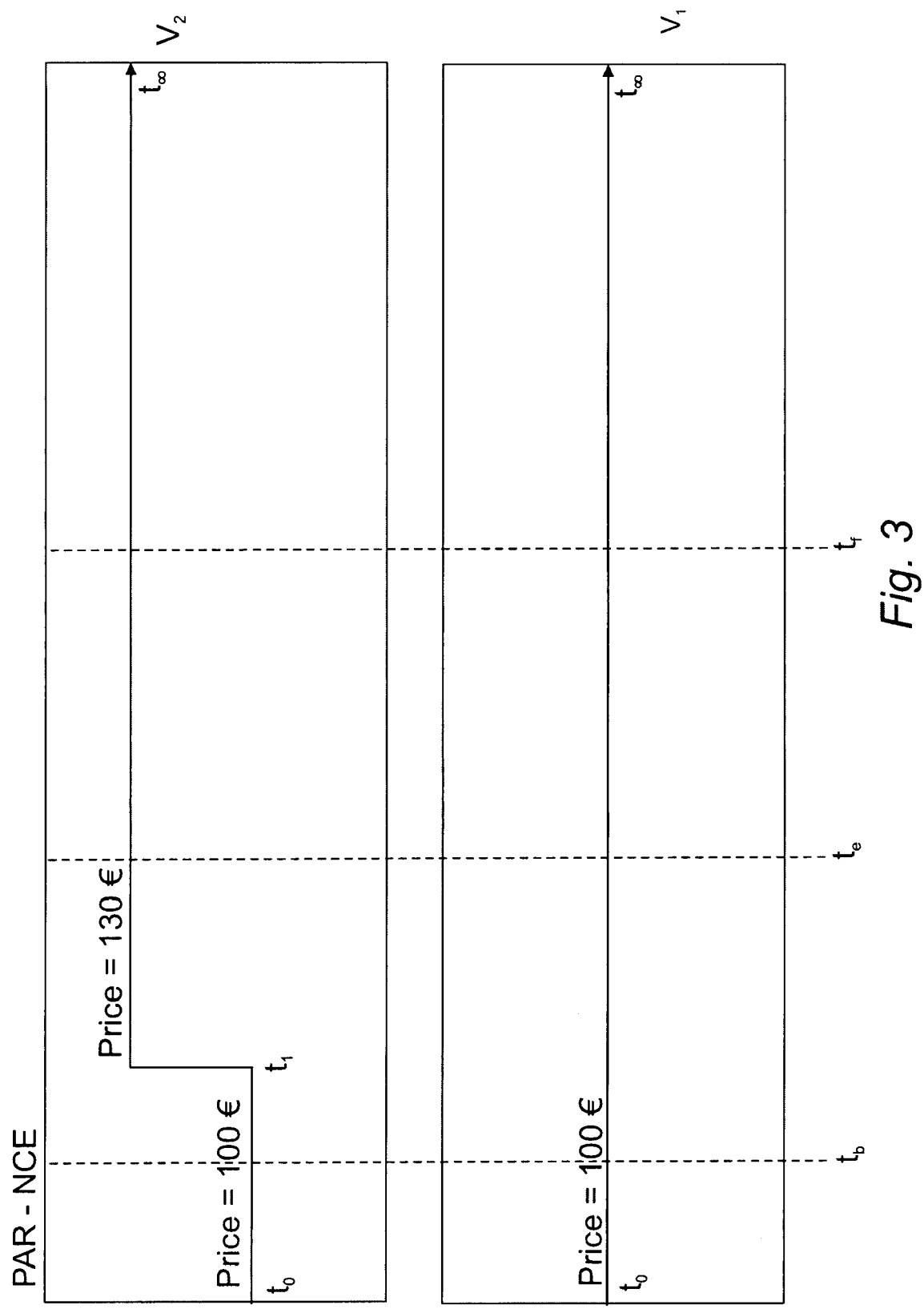
FIG. 3 is an example demonstrating version control in accordance with one embodiment of the present invention, by way of example.

Referring to FIG. 3, an example of the version control described above with reference to FIG. 2 will be used to clarify the mechanism of the present invention. The example relates to a system where a customer can purchase an airline ticket to a predetermined first location from a predetermined second location. For example, purchase of a ticket for a flight from Paris to Nice (PAR-NCE) for a specific airline (for example, Air France (Trademark)). FIG. 3 shows a timeline for the price of the ticket from time $t_0$ to time $t_\infty$ for two versions $V_1$ and $V_2$. Version $V_1$ exists between time $t_0$ to time $t_1$ and at time $t_1$ a new version $V_2$ is create which lasts nominally until time $t_\infty$. In version $V_1$ the price of the ticket is €100, and at time $t_1$, $V_2$ is created and the price of the ticket rises to €130. It will be appreciated that other versions may be created at any point in time and each time a new version is created it will become the active version at that given time. All previous versions will become linked to the active version but remain inactive, unless required, as will be described below. The number of versions is unlimited, although there may be a rule which determines an expiry time for previous versions.

In the example shown, at time $t_b$ a customer purchases a ticket from Paris to Nice for a time in the future (for example $t_f$). At time $t_b$ the price is €100 and corresponds to version $V_1$. At a later time $t_e$ the customer decides to change the time of travel and contacts the ticket supplier or operator in order to request reimbursement, exchange or transfer of the ticket. At this time the price of the ticket is €130 and corresponds to active version $V_2$. However, this was not the price or conditions under which the ticket was originally purchased, as these were the price and conditions under version $V_1$. In accordance with the present invention, when the operator enters the timestamp of the ticket, the system and method allows the operator to view a stored entity corresponding to $V_2$, which includes a list of active versions by timestamp. By comparing the timestamp when the ticket was originally purchased with the version timestamp, the system and method then directs the operator to the version that was active at the time of purchase, i.e. in this case version $V_1$. In this way the operator can accurately determine the price paid by the customer and use this to effect the reimbursement or exchange required by the customer.

It is important to note, that the system in accordance with the present invention does not discreetly store a copy of each version that has existed. Instead the active version at any given time includes a link to all previous versions, thereby allowing instant access to the relevant version based on the timestamp search. By implementing the invention in this way the operator is able to find the relevant information without a complex searching activity, thereby gaining access to the data required with a smaller response time. In situations where all relevant versions are searched within a memory environment the response time is likely to be considerably greater. Thus, the linkage provided between the active version and any previous versions is an advantage of an embodiment of the present invention.

Figures 4, 4A:
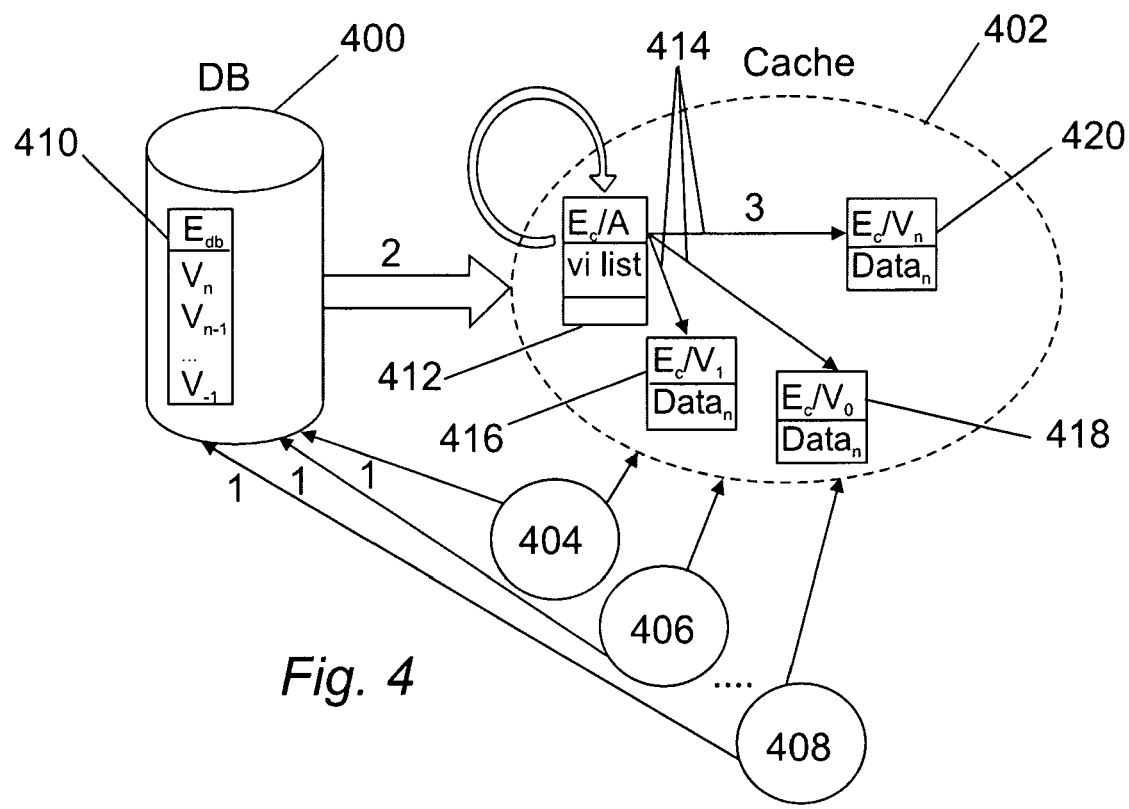
FIG. 4 is a simplified diagram of a system in accordance with one embodiment of the present invention, by way of example.

Referring to FIG. 4, details of the system are now described. The database 400 is connected to a cache 402. A plurality of operators (404, 406, and 408) is connected to the cache 402, in order to update, reimburse or exchange travel tickets. The database 400 includes a database entity 410 which includes details of all the various versions of data for a particular flight by a particular airline for example. The various versions of data stored in the database entity 410 are indicated as $V_n$, $V_{n-1}$, $V_{n-2}$, etc. At a certain point in time a new update $V_{n+1}$ is created by an operator (e.g. 404, 406, or 408) and loaded into the database as shown by arrows 1.

At any time there is a new update, the update must be entered into a cache data entity $E_{c/Vn}$ which corresponds to the version in question and becomes the active cache data entity. This update is shown by arrow 2. Previous cache data entities will become non-active, although there will be a link from the active cache data entity to each of the previous cache data entities.

FIG. 4a shows details of an example cache data entity 450. The cache data entity 450 includes the following: an access key element 452; an indicator relating to the active version and the timestamp that corresponds to the active version 454; a sorted list of previous versions and associated timestamps 456; and full content of the active version of data 458. The access key element 452 is common for all entities in a particular series in question. In this example, the series in question refers to the destination of departure and arrival and the airline issuing the ticket. For example, a flight from Paris to Nice (PAR-NCE) provided by Air France (Trademark) is a particular series of data entities, where each entity is a version of the series. The indicator 454 will relate to the current active version and indicate the timestamp at which that active version started. The sorted list of previous versions and associated timestamps will show all the previous versions and their start and finished times. It will be appreciated, that only one of the start and finish dates may be used in certain embodiments of this invention. The active data 458 includes all the relevant parameters relating to an airline ticket and typically includes several thousand different parameters.

Returning now to FIG. 4 an active cache data entity 412 is identified in the cache 402. In addition, there are links shown by arrows 414 to a number of previous versions of the cache data entity (416, 418, 420) that are no longer active. If a new version of the active cache data entity 412 is to be created, the new version will be entered into the cache. The effect of this will be to push the previous active entity to become version $V_n$ and the newly entered active cache data entity to become version $V_{n+1}$ (according to FIG. 4 the name of the version is $E_c/A$). The arrow shown as 3 indicates the conversion of the active data entity to a previous data entity.

An operator, for example, 404 may wish to update a ticket from Paris to Nice provided by Air France for a customer who has changed the previously booked travel plans. In order to do this the operator 404 must search for the relevant cache data entity relating to the ticket in question. The active cache data entity is found by means of the access key element 452 (in FIG. 4a) which is where the operator is directed whenever Paris to Nice and Air France are identified. In addition, the operator will enter the details of the timestamp of purchase of the original ticket. By virtue of the timestamp entered the active cache data entity will be searched for a timestamp which corresponds with the timestamp of the ticket. On identifying the timestamp range of a particular version that corresponds to the timestamp of the ticket, the active cache data entity will indicate the version that was active when the ticket was purchased. At this point one of two things may occur. If the timestamp of the ticket corresponds to the active cache data entity, the operator will access the active data 458 (in FIG. 4a) immediately. If the timestamp of the ticket corresponds to a previous version, this version will be identified from the list 456. The data entity will then direct the operator to that version by means of one of links 414. Similar processes may be activated by other operators 406 or 408, although maybe in relation to other departure and arrival destinations and other airlines. The cache is a dynamic element which is continually changing and being updated by changes in version and the like. Each entity is a self-contained logical entity which has the same general format to enable ease of access by the operator.

It will be appreciated that this invention is not limited to flight tickets generated for a particular airline that can be used for any element for sale where the customer may wish to exchange, reimburse or update the element at some stage in the future and where a parameter of such elements may change with time. The invention provides traceability of the or each version of the data entity, by keeping track of the development and changes in the data entity. The data entity could be a document or other form of information relating to a flight ticket or any other appropriate document. The parameter also may have many variations, including for example; price, tax, special offers or any other data that may change with time in respect of an element for sale. The embodiment described throughout the description generally relates to two versions (an active version and a previous version). However, it will be appreciated there could be any number of versions and that each new active version includes a list of all previous versions as has been described above.

Figure 5:
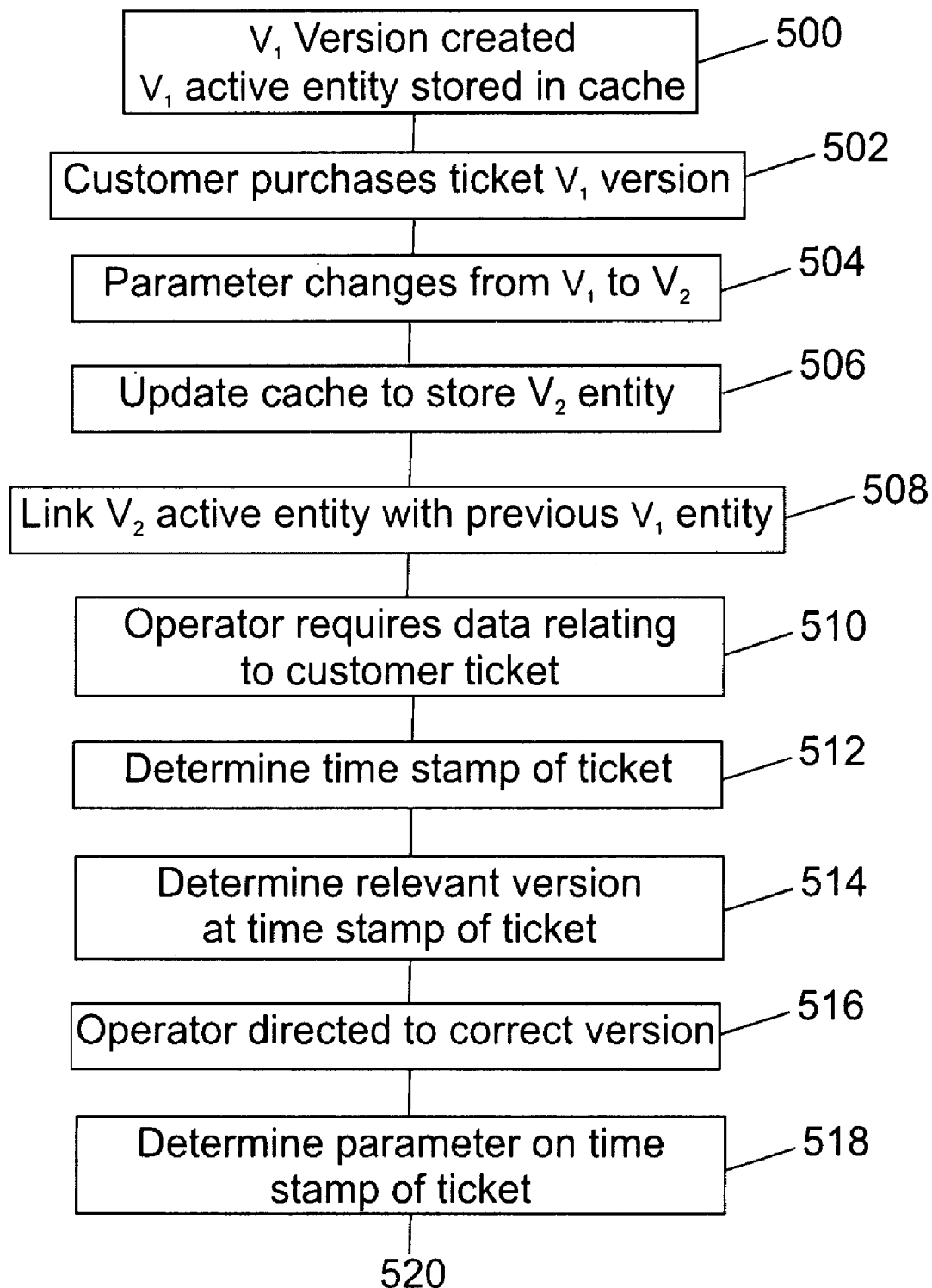
FIG. 5 is a flow chart of the methods steps in accordance with one embodiment of the present invention, by way of example.

Reference will now be made to FIG. 5 to illustrate the method steps carried out in the implementation of an embodiment of the present invention. In step 500 a first version of the data $V_1$ is created with a plurality of parameters of which one or more may change. The active $V_1$ entity is stored in the cache. In step 502, a customer purchases a ticket which corresponds to the parameters in the $V_1$ version of the data. At step 504, one or more parameters of the data are changed and version $V_2$ is created. At step 506, the cache is updated to store the $V_2$ entity. The $V_2$ entity is then linked with the previous $V_1$ entity in step 508 and the $V_2$ entity becomes the active entity. At step 510 an operator requires data relating to the tickets purchased by the customer at step 502. The operator determines the timestamp of issue of the ticket at step 512 and then interrogates the cache at step 514 to determine the relevant version of the data that matches the timestamp of the ticket having the relevant access key element 452. The operator is then directed to the correct version of the data based on the timestamp of the ticket at step 516. This then enables the operator to determine the parameters when the ticket was purchased to effect an exchange, reimbursement or any other action. The process then terminates at 520.

The process may recommence at any appropriate point in the steps when an action is required. A further new version may be created at step 504 in which case steps 506 and 508 will also be carried out. Alternatively, the version does not change but the operator wishes to determine data relating to the ticket from another customer. In this case steps 510, 512, 514, 516 and 518 will be carried out. Obviously, in this situation there may have been a number of occurrences of step 502 where a plurality of customers has purchased tickets of one version or another.

It will be appreciated that various combinations of methods steps in combination or alone may be carried out for different elements of the overall process. The various combinations are not limited to those described above that may include any other combination.

It will be appreciated that this invention may be varied in many different way and still remain within the intended scope and spirit of the invention.

The invention claimed is:

1. A method of identifying a parameter in a version of a data entity created at a specific time, wherein the data entity comprises at least one parameter and wherein at a first time the version of the data entity is an active version of the data entity and at a second time the version of the data entity is a previous version of the data entity, the method comprising the steps of:
   creating a first version of the data entity;
   storing the first version of the data entity in a memory location, such that the first version of the data entity is the active version of the data entity at the time it is stored;
   updating at least one parameter in the data entity thereby creating a second version of the data entity;
   storing the second version of the data entity in a memory location, such that at the time the second version is stored the second version of the data entity comprises the active version of the data entity and the first version of the data entity comprises a previous version of the data entity, the second version of the data entity including a sorted list of each previous version of the data entity, each previous version being associated with an associated time at which each version of the data entity was an active version of the data entity;
   identifying a time range, wherein the associated time is in the time range, to determine the version of the data entity which was active at the associated time by looking up the associated time in the list;
   accessing the version of the data entity which was active at said associated time; and
   determining the parameter from that version of the data entity.

2. The method of claim 1, further comprising creating each version of the data entity such that each version includes the same common key.

3. The method of claim 2, further comprising searching for a set of versions of the data entity by searching for the common key.

4. The method of claim 1, further comprising creating further versions of the data entity from time to time, such that the newest version of the data entity is the active version.

5. The method of claim 1, further comprising generating a timestamp for each version of the data entity as it is created.

6. The method of claim 5, further comprising identifying the active version at the specific associated time using the timestamp.

7. The method of claim 5, further comprising basing the timestamp upon GMT.

8. The method of claim 5 further comprising providing traceability of each version of the data entity.

9. The method of claim 1, further comprising providing the data entity as a set of data associated to a product or a service.

10. The method of claim 1, further comprising selecting the parameter as one of the group containing a price, a tax, a destination, a location, a special offer or any other parameter relating to a product or service.

11. The method of claim 1, further comprising using the parameter from the appropriate previous version to carry out an action.

12. A system for identifying a parameter in a version of a data entity created at a specific time, wherein at a first time the version of the data entity is an active version of the data entity and at a second time the version of the data entity is a previous version of the data entity, the system comprising:
- a database for storing the plurality of versions of the data entity as they are created;
- a cache memory for storing the first active version of the data entity;

wherein when a new version of the data entity is created by updating at least one parameter of the data entity, a new active version of the data entity replaces the first active version of the data entity stored in the cache memory and the first active version of the data entity becomes a previous version of the data entity stored in the cache memory; and wherein the new active version of the data entity includes a list of each previous version of the data entity, each previous version being associated with an associated time at which each version of the data entity was an active version of the data entity, such that by identifying a time range, wherein the associated time is in the time range, the version of the data entity which was active at the associated time an appropriate previous version is identified and read to determine the parameter in that version at the associated time.

* * * * *